(12) United States Patent
Takada

(10) Patent No.: US 6,730,226 B2
(45) Date of Patent: May 4, 2004

(54) WATER PURIFYING METHOD AND APPARATUS

(76) Inventor: Shunsuke Takada, 22-5, Kakinokizaka, 1-chome, Meguro-ku, Tokyo, 152-0022 (JP)

( * ) Notice: Subject to any disclaimer, the term of this patent is extended or adjusted under 35 U.S.C. 154(b) by 69 days.

(21) Appl. No.: 09/990,568

(22) Filed: Nov. 21, 2001

(65) Prior Publication Data

US 2003/0094411 A1 May 22, 2003

(51) Int. Cl.$^7$ ............................. C02F 3/30; A01K 63/04
(52) U.S. Cl. ............... 210/630; 210/169; 210/260; 210/903; 119/227; 119/260
(58) Field of Search ................... 210/615, 616, 210/630, 150, 169, 170, 252, 260, 336, 903; 119/227, 260, 261

(56) References Cited

U.S. PATENT DOCUMENTS

| 606,592 | A | * | 6/1898 | Snell | 210/264 |
|---|---|---|---|---|---|
| 1,057,870 | A | * | 4/1913 | Monnet | 209/208 |
| 1,628,510 | A | * | 5/1927 | Perry | 210/202 |
| 1,688,915 | A | * | 10/1928 | Astrom | 210/252 |
| 1,751,459 | A | * | 3/1930 | Simmer | 210/605 |
| 4,620,929 | A | * | 11/1986 | Hofmann | 210/610 |
| 4,978,445 | A | * | 12/1990 | Long | 210/195.3 |
| 5,674,389 | A | * | 10/1997 | Rhee | 210/232 |
| 5,798,040 | A | * | 8/1998 | Liang | 210/232 |
| 5,958,239 | A | * | 9/1999 | Sing | 210/605 |
| 6,190,548 | B1 | * | 2/2001 | Frick | 210/170 |
| 6,413,427 | B2 | * | 7/2002 | Tipton et al. | 210/605 |
| 6,488,851 | B1 | * | 12/2002 | Almog | 210/605 |

FOREIGN PATENT DOCUMENTS

JP 62-23499 * 1/1987

* cited by examiner

Primary Examiner—Fred G. Prince
(74) Attorney, Agent, or Firm—Robert D. Katz; Cooper & Dunham LLP

(57) ABSTRACT

A method for purifying water including nitrification by aerobic bacteria and denitrification by anaerobic bacteria in an apparatus by providing an elongated, closed water channel.

5 Claims, 6 Drawing Sheets

WATER PURIFYING METHOD AND APPARATUS

FIELD OF THE INVENTION

The present invention relates to a water purifying method and an apparatus used therefor, and particularly to a water purifying method capable of increasing purifying efficiency and facilitating maintenance by use of an elongated, closed water channel.

BACKGROUND OF THE INVENTION

A conventional basic system for purifying sewage or water in a fish tank or the like generally includes the following steps: physically removing a solid matter through a screen (filter); decomposing ammonia contained in the contaminated water into nitrous acid, and then converting a nitrate by oxidizing (or nitrifying) the ammonia using aerobic bacteria such as active sludge.

However, nitrification of ammonia only is insufficient for purifying water, because nitrate generated in water increases acidity of the water, and causes eutrophication. Accordingly, it has been attempted to remove (denitrify) the nitrate, more specifically, convert the nitrate into a nitrogen gas by action of anaerobic bacteria, thereby more completely to purify the water. Moreover, in the nitrification step using aerobic bacteria, a large amount of oxygen must be supplied to activate the aerobic bacteria. In some cases, this oxygen must be provided by using fluidizing or stirring means.

The denitrification step using anaerobic bacteria, however, should be carried out without oxygen, for example, by closing a denitrification tank or by temporarily stopping the water flow. It is very difficult to continuously establish these inconsistent conditions of nitrification and denitrification in the same equipment. This has limited practical use miniaturization of the conventional water purifying apparatus.

SUMMARY OF THE INVENTION

The present invention provides a method which comprises propagating, at the first stage of an elongated, closed water channel, aerobic bacteria for realizing nitrification, and then disposing, at a later stage (by which point oxygen is almost consumed by the aerobic bacteria), a second stage having anaerobic bacteria. By this method, the water flowing through the apparatus, will nitrify and then denitrify a specific amount of water successively flowing in the same water channel.

The use of the elongated, closed water channel makes it possible to prevent a so-called "channel phenomenon" in which water flows only through a specific portion of a filter material, thereby help to use the entire filter medium. It also makes it possible to locate aerobic and anaerobic bacteria at different places in the same water channel, and thereby to obtain nearly perfectly purified water. The method permits miniaturization of the apparatus.

DETAILED DESCRIPTION OF THE PREFERRED EMBODIMENTS

Figure 1:
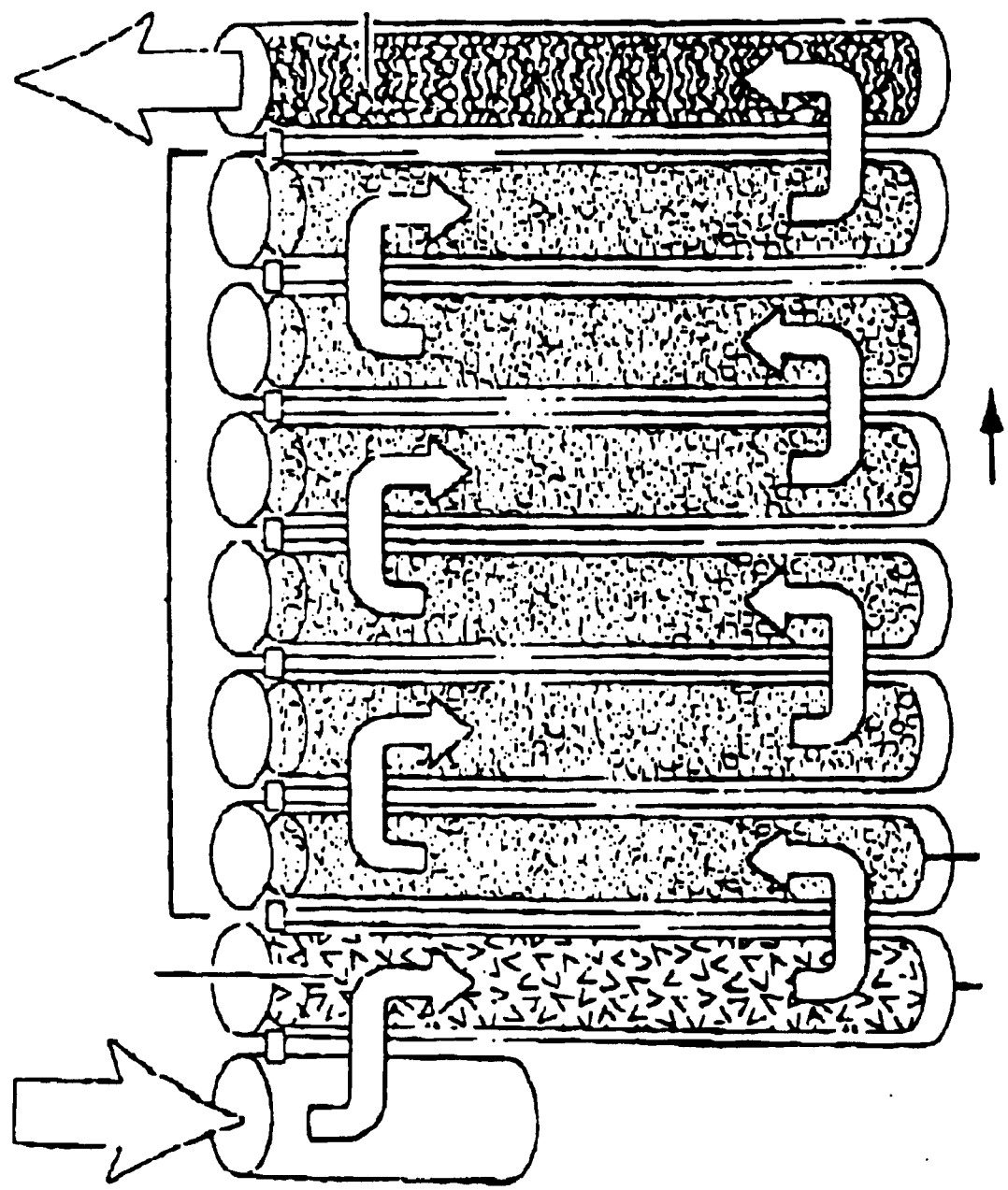
FIG. 1 is a view illustrating a basic principle of the present invention.

FIG. 1 shows a most basic embodiment of the present invention. Referring to FIG. 1, water to be purified is pumped up from a water tank $1a$ to be subjected to water purification as shown by an arrow "from water tank" $1a$ at an upper left portion, and is supplied to one, positioned at a left end, of a plurality (eight pieces in the figure) of cylindrical "filter vessels" $1e$. The "filter vessels" $1e$ are fluidly connected to each other with their upper and lower ends alternately connected to each other in a zigzag pattern. The water flows $1g$ along a path shown by arrows to reach the "filter vessel" $1e$ at a right end, and is then returned to the original water tank therefrom $1h$.

The eight "filter vessels" $1e$ constitute an elongated, closed water channel as a whole. The left end filter vessel constitutes a physical filtration portion $1c$ for removing solid matter, and the subsequent six filter vessels constitute biofiltration portions using aerobic bacteria $1d$. The right end filter vessel constitutes a biofiltration portion by anaerobic bacteria $1i$.

Where water to be purified has been supplied from the pump $1b$ to the left end of the filter vessel $1c$, oxygen in an amount sufficient to propagate aerobic bacteria is contained, together with organic matter, in the water. However, as the water flows $1g$ to the right side, the oxygen is consumed by the aerobic bacteria, and the oxygen content in the water is thereby reduced. Consequently, when the water reaches the right end filter zone, little oxygen remains in the water. The concentration of oxygen in water for allowing propagation of anaerobic bacteria is generally regarded as 2 mg/L or less. When the water reaches the right end filter vessel in the present invention, the concentration of oxygen in water nearly reaches 2 mg/L. Until the water reaches the right end filter zone, the organic matter in the water to be purified is nitrified and a concentration of nitrate is correspondingly increased. The nitrate component thus generated, however, is denitrified by anaerobic bacteria in the right end filtration zone. The water is thus purified and is then returned to the water tank or source.

Figure 2:
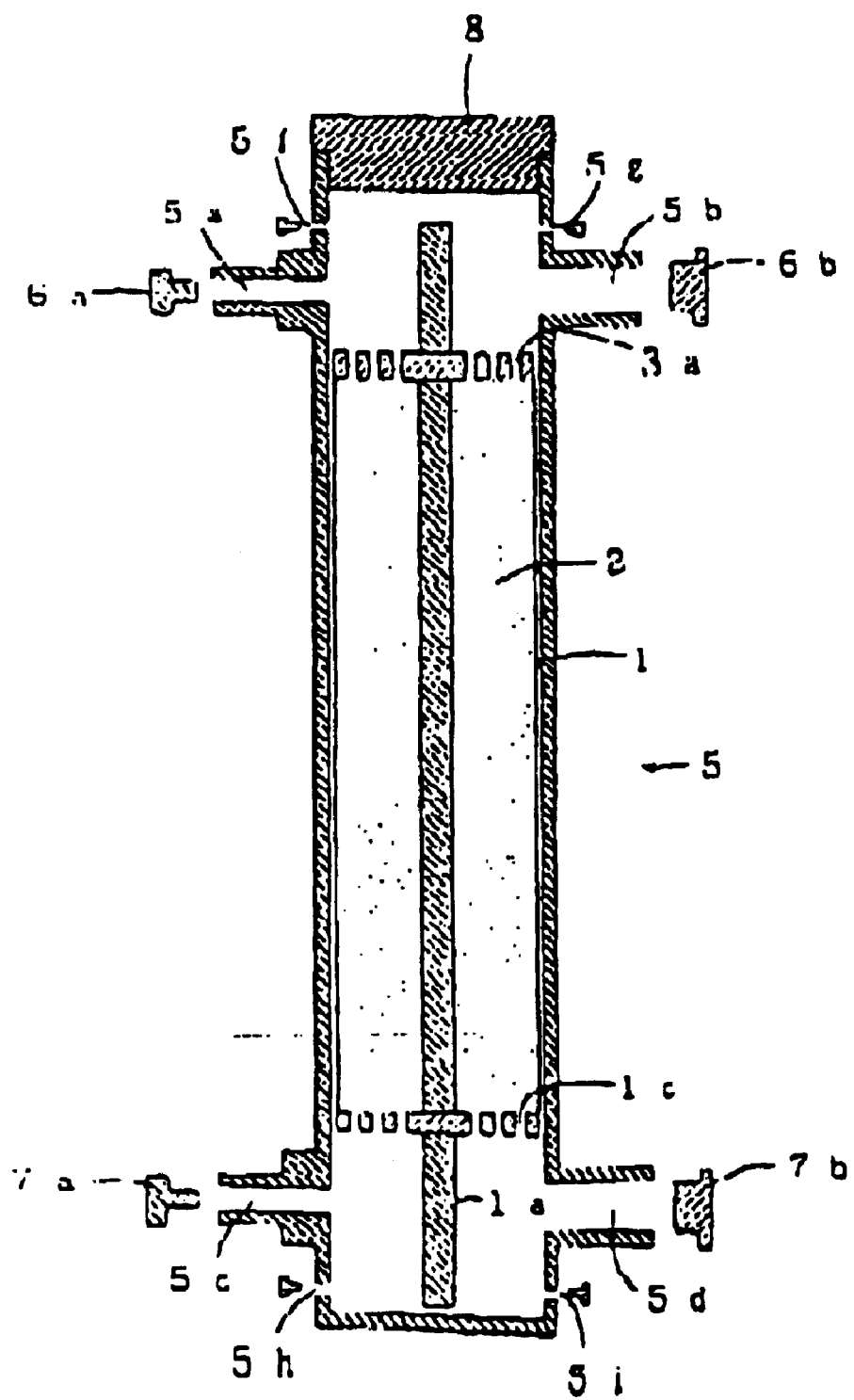
FIG. 2 is a view showing a structure of a cylinder body used as part of a water channel of the present invention, and is a sectional view showing one example of an inner structure of each of the cylinder bodies.
Figure 3:
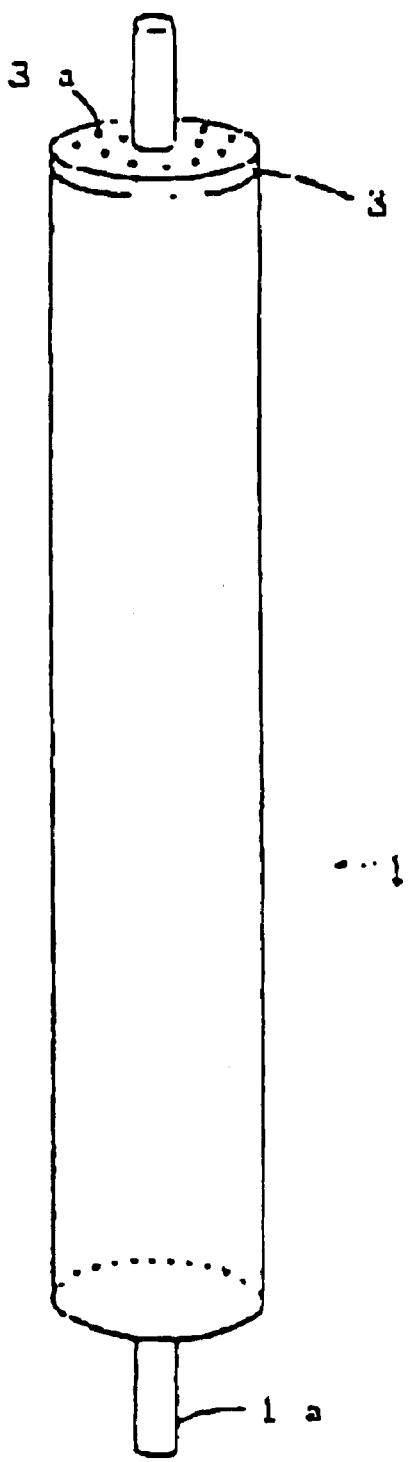
FIG. 3 is a view showing an inner cylinder inserted in the cylinder body in which a filter material is inserted.

Referring to FIGS. 2 and 3, an inner cylinder 1 (shown in FIG. 3) is filled with a filter material. A center shaft $1a$ of the inner cylinder 1 extends from upper and lower end portions of the inner cylinder 1. A lid 3 is fitted in the upper end portion of the inner cylinder 1. The lid 3 has a large number of small holes $3a$ through which water is allowed to pass after the inner cylinder 1 is filled with the filter material 2. Similarly, a bottom portion of the inner cylinder 1 has small holes $1c$.

The inner cylinder 1 shown in FIG. 3 is contained in a cylinder body 5 shown in FIG. 2. The cylinder body 5 has, at opposed side positions of the upper end, a pair of communication portions $5a$ and $5b$ with lids $6a$ and $6b$. The cylinder body 5 also has, at opposed side portions of the lower end, a pair of communication portions $5c$ and $5d$ with lids $7a$ and $7d$.

The communication portion $5b$ at the upper end of one cylindrical body 5 attaches to the opening $5a$ at the upper end of the adjacent right side cylindrical body 5 (not shown). By attaching both the cylindrical bodies 5 to each other, a continuous water channel is formed between both the cylindrical bodies 5. Similarly, a water channel can be formed by connecting the opening 5d of one cylindrical body 5 to the opening 5c of the adjacent right side cylindrical body 5. The communication portions of both the cylindrical bodies 5 are not necessarily directly connected to each other, but may be indirectly connected to each other via a rubber or plastic pipe. The communication portion 5d at the lower end of one cylindrical body 5 can be connected to the communication portion 5a at the upper end of the adjacent right side cylindrical body (not shown) by a pipe.

Small holes 5f, 5g, 5h, and 5i with lids may be formed in the side surface of the cylindrical body 5 at positions offset outwardly from the upper and lower communication portions 5a to 5d. These small holes 5f to 5i can be used as vent holes or drain holes, as needed. For example, gas located in one cylindrical body 5 can be removed by opening the lids of the upper small holes 5f and 5g in the cylindrical body 5. Likewise, precipitation formed in one cylindrical body 5 can be removed by opening the lids of the lower small holes 5h and 5i in the cylindrical body 5. In addition, a sample of water in one cylindrical body 5 located in the nitrification region can be removed by using the small holes before the water flows to the denitrification region. The sample of water can be used for adjustment of water quality or propagation of anaerobic bacteria.

More particularly, if the total length of the cylindrical bodies forming the nitrification region is excessively short, or if the amount of water flowing through the region or zone is excessively large, or the ratio of the amount of the filter materials to the amount of water is excessively small, then the amount of oxygen remaining in water flowing into the anaerobic bacteria region becomes undesirably high. This may adversely affect propagation of anaerobic bacteria in the denitrification region. To remedy this, part of the contaminated, partially purified water is removed before the water flows in the anaerobic bacteria region, while monitoring the water quality. In this case, the above-described small holes can be used as outlets to a bypass route.

The bottom portion of the cylindrical body 5 is closed. On the other hand, the top portion of the cylindrical body 5 is open for allowing insertion or removal of the inner cylinder 1 in or from the cylindrical body 5, and is provided with a closable lid 8. Since the cylindrical bodies 5, each of which contains the filter material 2, are configured as cartridge units under the same standard, it is possible not only to produce the cylindrical bodies 5 at low cost, but also to assemble a purifying apparatus having a required length from the cylindrical bodies 5 of a suitable number.

A purifying apparatus can be assembled from the cylindrical bodies 5 by arranging the cylindrical bodies 5 in parallel with their longitudinal directions directed in the vertical directions, alternately connecting the upper and lower communication portions 5a to 5d to each other in a zigzag pattern, and closing the unnecessary communication portions with the lids. The purifying apparatus thus assembled has a long zigzag shaped water channel as shown by arrows in FIG. 1 as a whole. Another purifying apparatus having a long zigzag water channel similar to that described above can be fashioned by connecting the lower communication portion 5d of one cylindrical body 5 to the upper communication portion 5a of the adjacent right side cylindrical body 5, in series. A further purifying apparatus can be also obtained by preparing pre-assembled blocks, each of which is composed of a plurality of the cylindrical bodies 5, and connecting the pre-assembled blocks to each other.

In actual operation of the purifying apparatus, water to be purified is introduced in the communication portion 5a of the cylindrical body 5 at the leading end, and the inner cylinder 1 contained in the cylindrical body 5 is filled with a filter material suitable for physical filtration. The cylindrical body 5 at the final stage is filled with a filter material suitable for propagation of anaerobic bacteria and the purified water is discharged from the communication portion 5b of the cylindrical body 5. A further embodiment in which the present invention is applied to a purifying apparatus used for a water tank for aquarium fishes will be hereinafter described. In such an embodiment, the diameter of each cylindrical body 5 is set to about 3 cm and a length thereof is set to about 30 cm.

For a square shaped water tank having a width of 60 cm, which is generally called "Type 60," eight cylindrical bodies 5 are connected to each other. In this water tank, the effective total length is about 228 cm. For a water tank having a width of 120 cm, the cylindrical bodies 5 of eight pieces are further connected to those for the above square shaped water tank. In this embodiment, the total length is about 456 cm.

EXAMPLE

Figure 4:
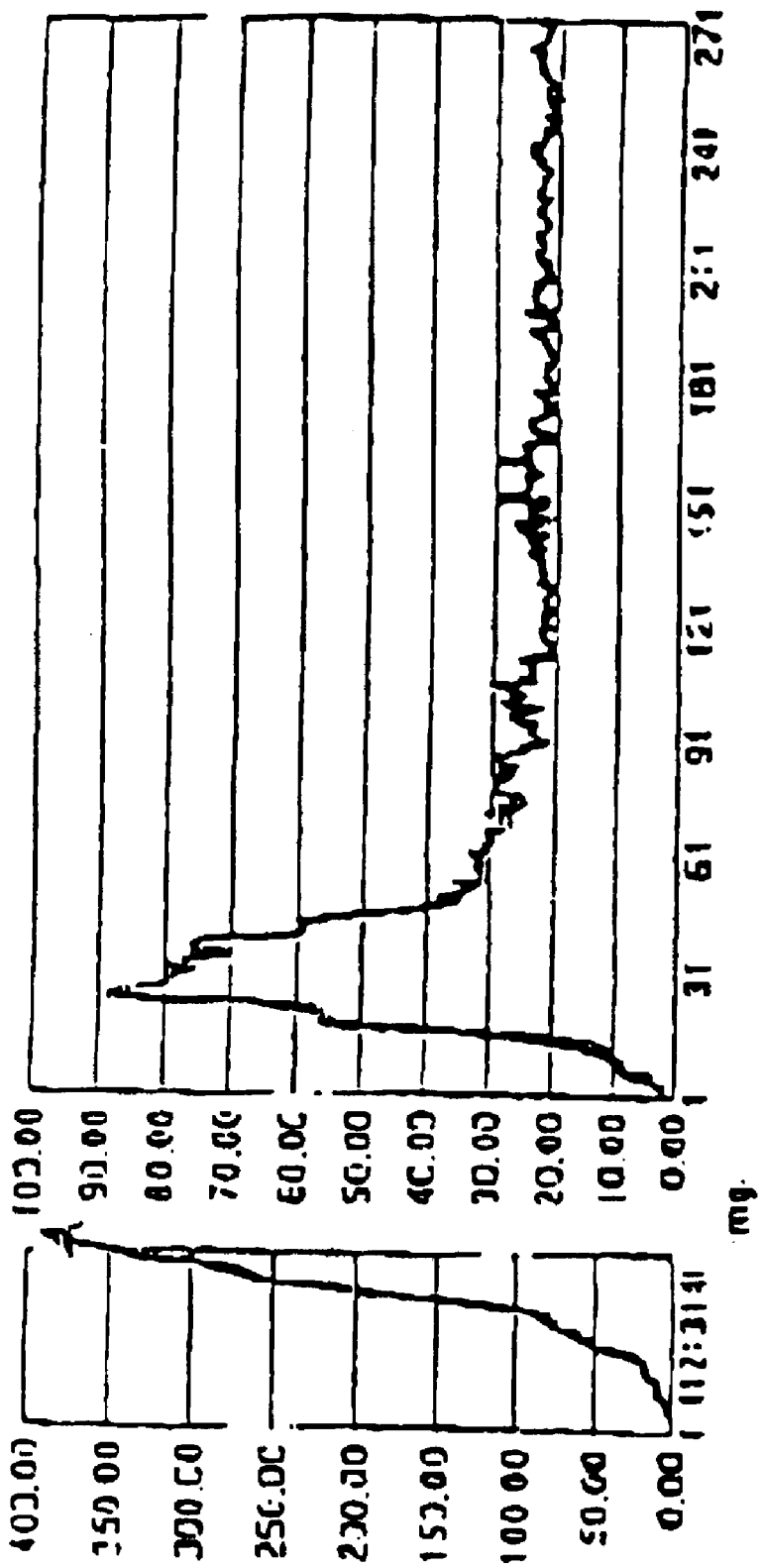
FIG. 4 is a graph showing a result obtained by an experiment using an apparatus of the present invention.
Figure 5:
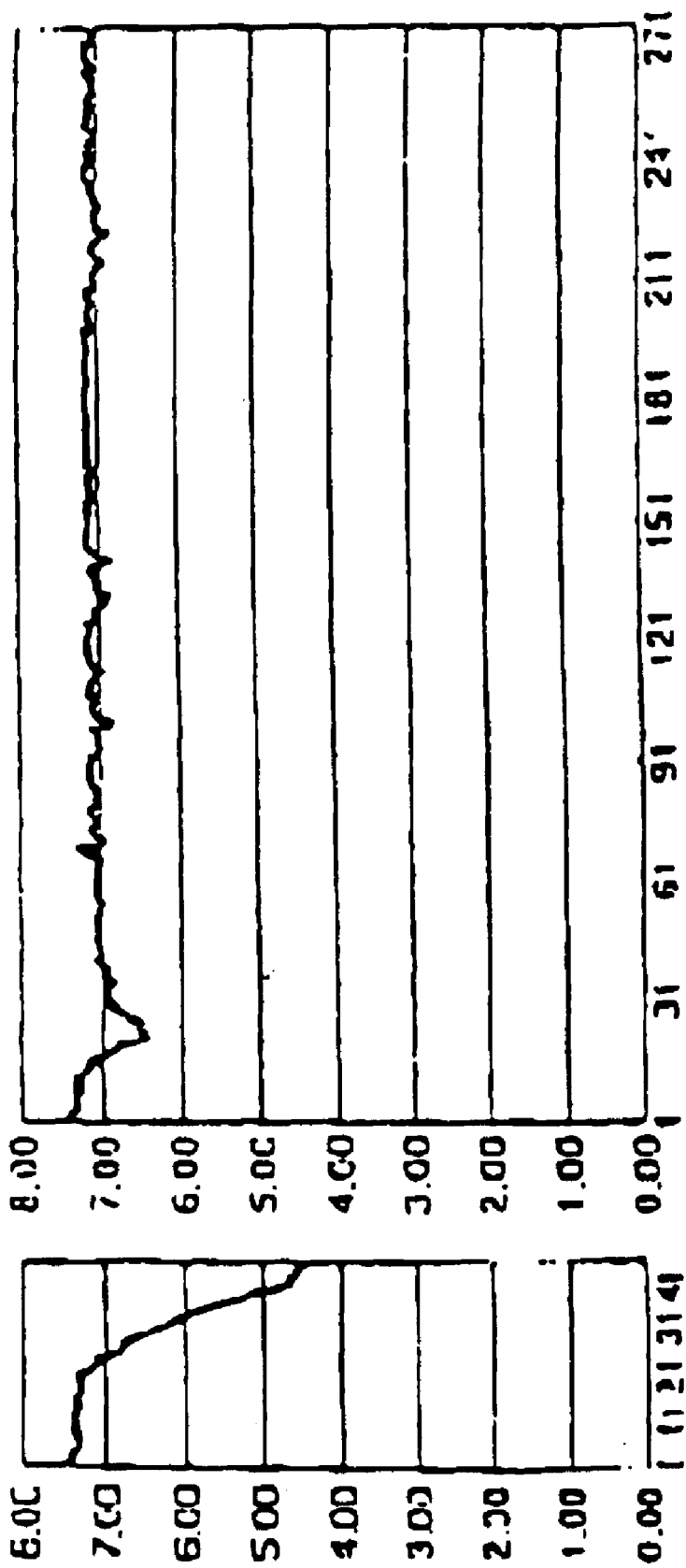
FIG. 5 is a graph showing another result obtained by the experiment using the apparatus of the present invention.
Figure 6:
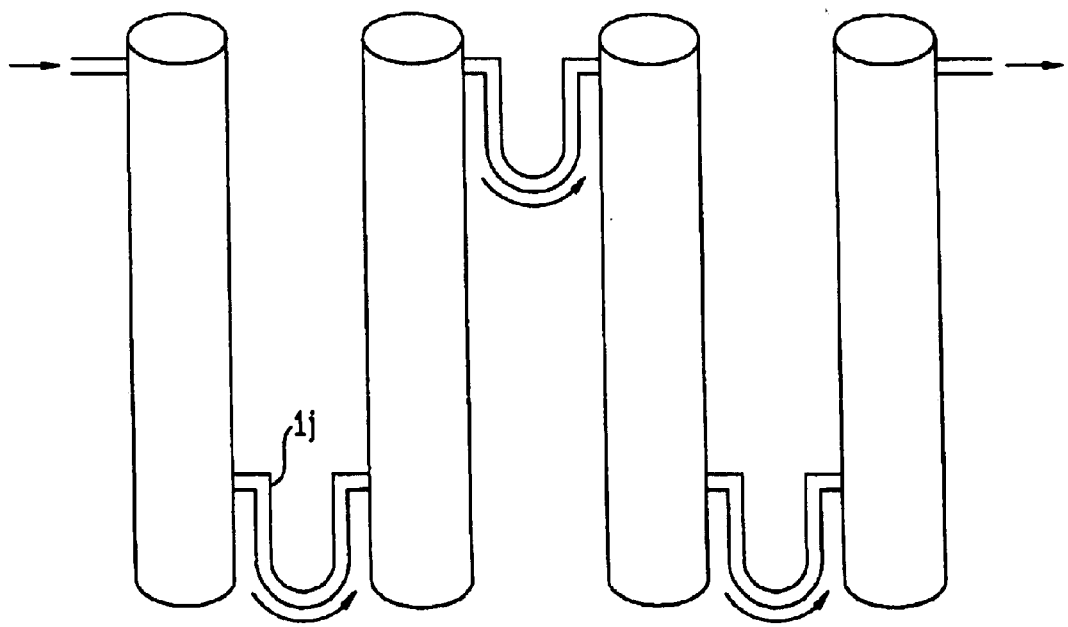
FIG. 6 is a view showing the cylinders connected by u-shaped tubes $1j$.
Figure 7:
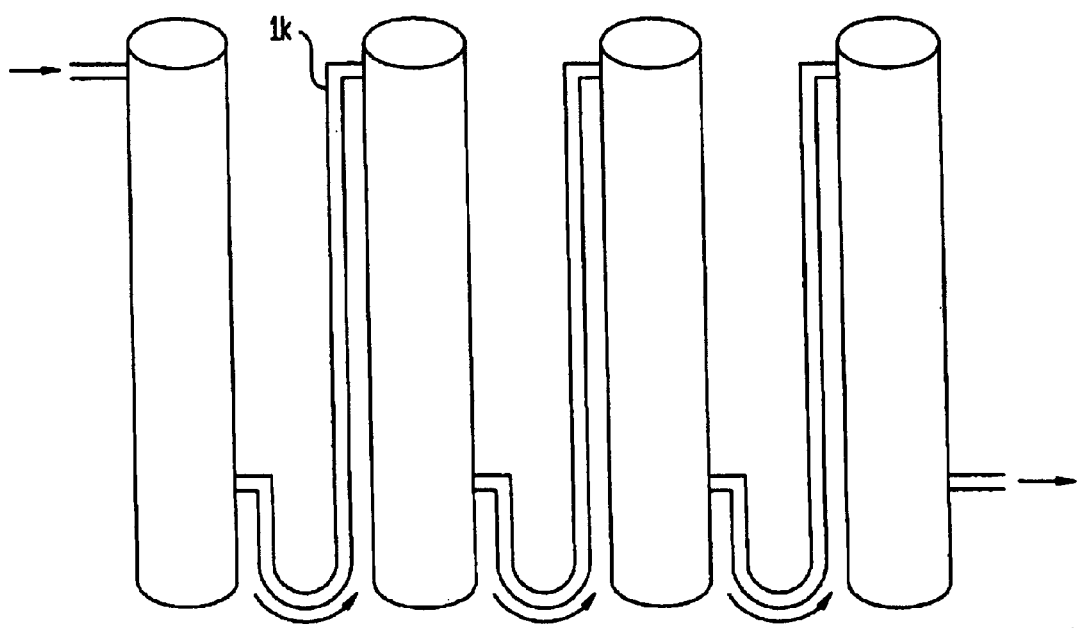
FIG. 7 is view showing the cylinders connected by j-shaped tubes $1k$.

Results of an experiment carried out using the apparatus of the present invention for the Type 60 water tank with the most popular commercial purifying apparatus for the Type 60 water tank are shown in FIGS. 4 and 5 (Experimenter: Masamichi Tuji, assistant professor at Tokyo Institute of Technology). The experiments were carried out by preparing both the Type 60 water tanks, each of which was filled with the same amount of water adjusted to the same conditions, and putting 20 living angel fish in each of the water tanks.

The control water tank, used a filter Type 2426 filter sold by Eheim Company, and each of filter materials recommended by Eheim Company, Eheisubstrat 2.5 liter and Eheimek 1.5 liter. On the other hand, for the inventive apparatus, a sponge filter and a wool mat were used for physical filtration at the first stage; a Power House Type M 0.88 liter and Type S0.88 liter were used in the aerobic bacteria filtration region; and 100 g of Denny Ball (trade name) as an organic carbon agent were used for the anaerobic bacteria filtration region at the final stage.

Consequently, as shown in FIG. 4, in each of the water tanks, the concentration of nitrate in filtered water increased after an elapse of 15 to 18 days since the start of the experiment; whereas in the inventive apparatus, the concentration gradually decreased after an elapse of about 23 to 24 days and stayed at an approximately constant value after an elapse of 60 days. In the comparative water tank, the concentration further increased during the prolonged time period. With respect to a change in pH of the filtered water, in the inventive apparatus, as shown in FIG. 5, the pH was nearly stable at 7.0, while in the control water tank, the pH continuously, rapidly decreased, to reach a value of 4.5 regarded as the living limit of angel fish, necessitating the discontinuation of the experiment after 42 days.

In the inventive apparatus, the angel fish continue to grow after an elapse of nine months. This means that the inventive apparatus does not require exchanging water, which is usually necessary in the case of usual breeding of aquarium fish. That is, the inventive apparatus eliminates the cumbersome exchange of water, which has been regarded as the major inconvenience in breeding aquarium fish.

In addition, the reason why the concentration of the nitrate in the inventive apparatus initially increased as in the control water tank and then decreased, is believed to be as follows:

namely, in the initial stage, anaerobic bacteria is barely present in the water channel, but in the final stage, the propagation of anaerobic bacteria is promoted by creation of an anaerobic bacterial propagating environment and the action of the organic carbon, so that the function of the present invention starts in the final stage.

The above embodiment has been described by example of purification of water in a water tank for aquarium fish; however, the present invention is not limited thereto and may be applied to purification of sewage, human waste, river water, and the like. Depending on the quality of the water to be purified, the content of organic matter as a nutrient for propagating an aerobic bacteria may be initially small; however, the method and apparatus according to the present invention can be applied to any quality of water to be purified by adding an organic plastic material, an organic carbon material or the like as a nutrient for anaerobic bacteria in the filter material at the final stage.

As described above, the present invention provides a method for producing a desirable environment for propagating anaerobic bacteria at the final stage of a water purification system by using an elongated, closed water channel, thereby continuously purifying water into a neutral state for a long-period of time by the denitrifying action of the anaerobic bacteria, and also provides an apparatus useful therefor.

The apparatus of the present invention in which cylindrical bodies U-or-J shaped are connected to each other to form a zigzag-shaped elongated water channel also keeps the channel phenomenon to a minimum, facilitating exchange of filter materials, and miniaturization of the apparatus.

What is claimed is:

1. A method of purifying water comprising the steps of:

causing contaminated waste water to flow through an inlet into an elongated, closed water channel comprised of a plurality of cylinders connected in a series by a i-shaped or u-shaped tube;

nitrifying, in an aerobic treatment zone adjacent to the inlet in a first one of the plurality of cylinders, the waste water by aerobic bacteria; and denitrifying, the waste water with anaerobic bacteria in a treatment zone downstream from the aerobic zone and adjacent to an outlet of the water channel;

thereby producing purified waste water in which the content of a nitrate has been reduced.

2. A water purifying apparatus comprising:

an elongated, closed water channel having an inlet for contaminated waste water, and an outlet for purified waste water, wherein said closed water channel is comprised of a plurality of cylinders connected by a series of i-shaped or u-shaped tubes;

the channel comprising an aerobic bacteria treatment zone adjacent the waste water inlet, and an anaerobic bacteria treatment zone downstream from the aerobic bacteria zone, adjacent to the waste water outlet.

3. A water purifying, apparatus according to claim 2, wherein said elongated, closed water channel is formed by connecting a series of tubes so as to form a zigzag-shape.

4. A water purifying apparatus according to claim 2, wherein said elongated, closed water channel includes a plurality of J-shaped cylindrical tubes which are arranged with upper and lower end portions alternately connected to each other so as to form a zigzag shaped water channel.

5. A water purifying apparatus according to claim 2, wherein said elongated, closed water channel includes a plurality of U-shaped cylindrical tubes which are arranged with upper and lower portions alternately connected to each other so as to form a zigzag shaped water channel.

* * * * *